United States Patent [19]

Rigazio

[11] 4,364,602
[45] Dec. 21, 1982

[54] SEAT SUPPORT STRUCTURE FOR THE DRIVING OF AN EARTH MOVING MACHINE

[75] Inventor: Corrado Rigazio, Turin, Italy

[73] Assignee: Fiat-Allis Macchine Movimento Terra, S.p.A., Lecce, Italy

[21] Appl. No.: 164,503

[22] Filed: Jul. 2, 1980

[30] Foreign Application Priority Data

Jul. 27, 1979 [IT] Italy .............................. 68565 A/79

[51] Int. Cl.$^3$ ............................................. B60N 1/02
[52] U.S. Cl. ..................................... 297/334; 297/335
[58] Field of Search ................ 297/331, 334, 332, 335

[56] References Cited

U.S. PATENT DOCUMENTS

| | | | |
|---|---|---|---|
| 968,510 | 8/1910 | Clarke et al. | 297/334 |
| 1,473,945 | 11/1923 | Whiting | 297/334 |
| 1,769,343 | 7/1930 | Henry | 297/334 |
| 2,539,034 | 1/1951 | Ruby | 297/332 |
| 2,685,913 | 8/1954 | Schlueter | 297/332 |
| 3,480,324 | 11/1969 | Bauer et al. | 297/334 |
| 3,522,970 | 8/1970 | Francis | 297/335 |
| 3,542,325 | 11/1970 | Schwenk | 297/335 |

Primary Examiner—Francis K. Zugel
Attorney, Agent, or Firm—Anthony S. Zummer

[57] ABSTRACT

A seat support structure for a vehicle including a seat assembly mounted for selected pivotal movement about a pair of spaced lateral axes. Selective pivotal movement about the two axes is controlled by associated latch mechanisms to retain the seat assembly in a fixed position and to permit the release of the seat assembly for swinging movement independently about the two axes. The provision of such a capability for pivotal movement about a pair of axes allows orientation of the seat assembly at a remote position permitting access to components of the vehicle mounted beneath the floor or frame supporting the operator's seat.

12 Claims, 3 Drawing Figures

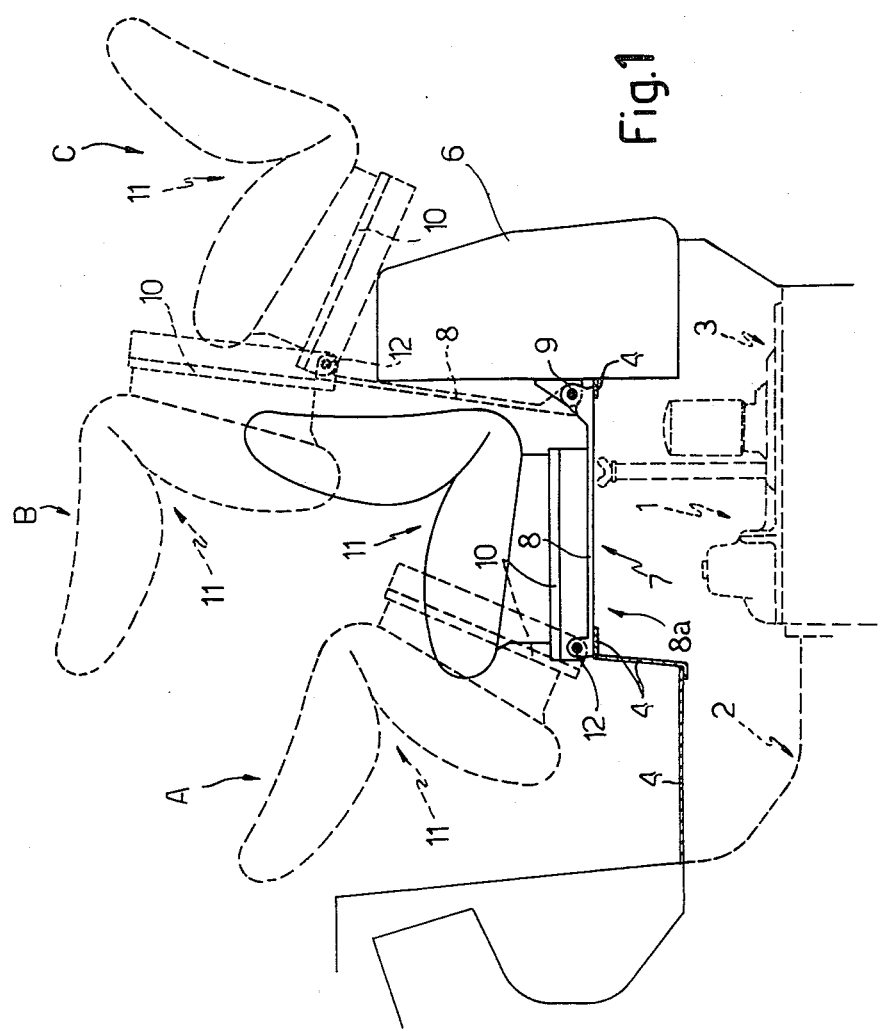

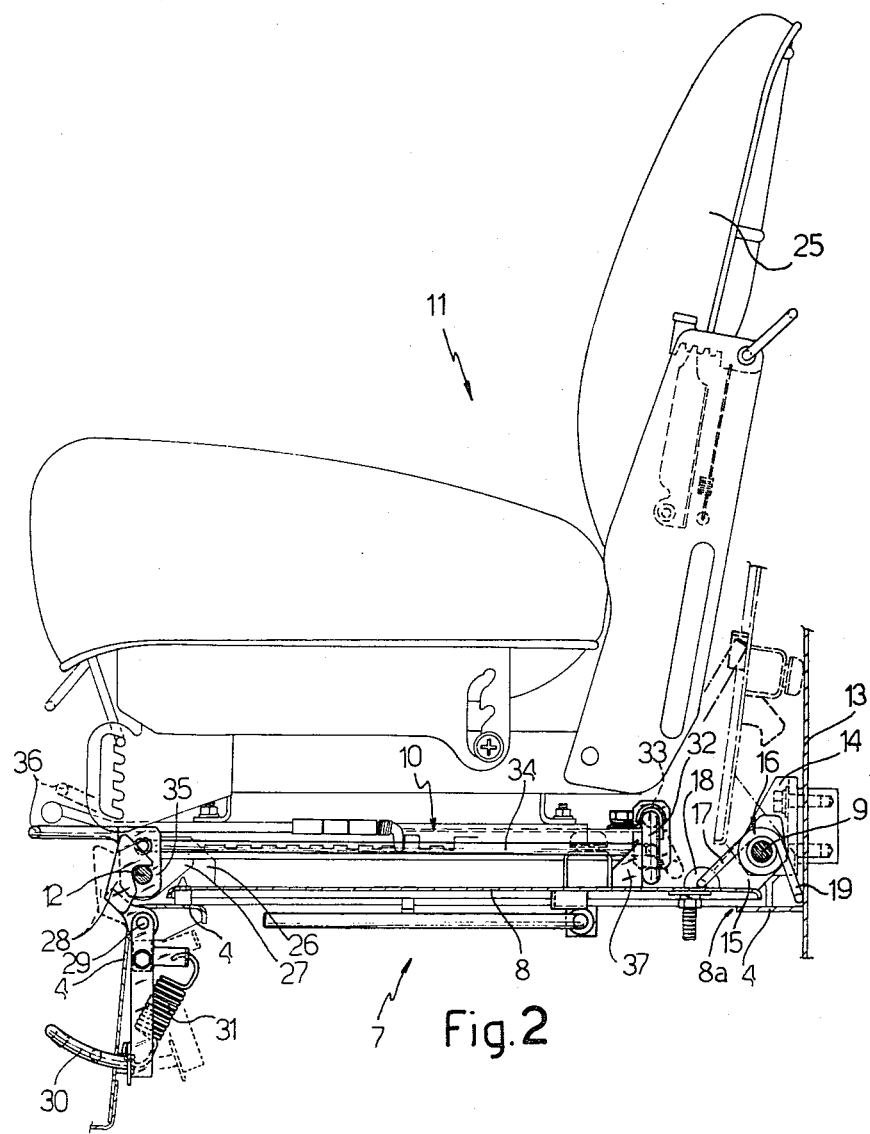

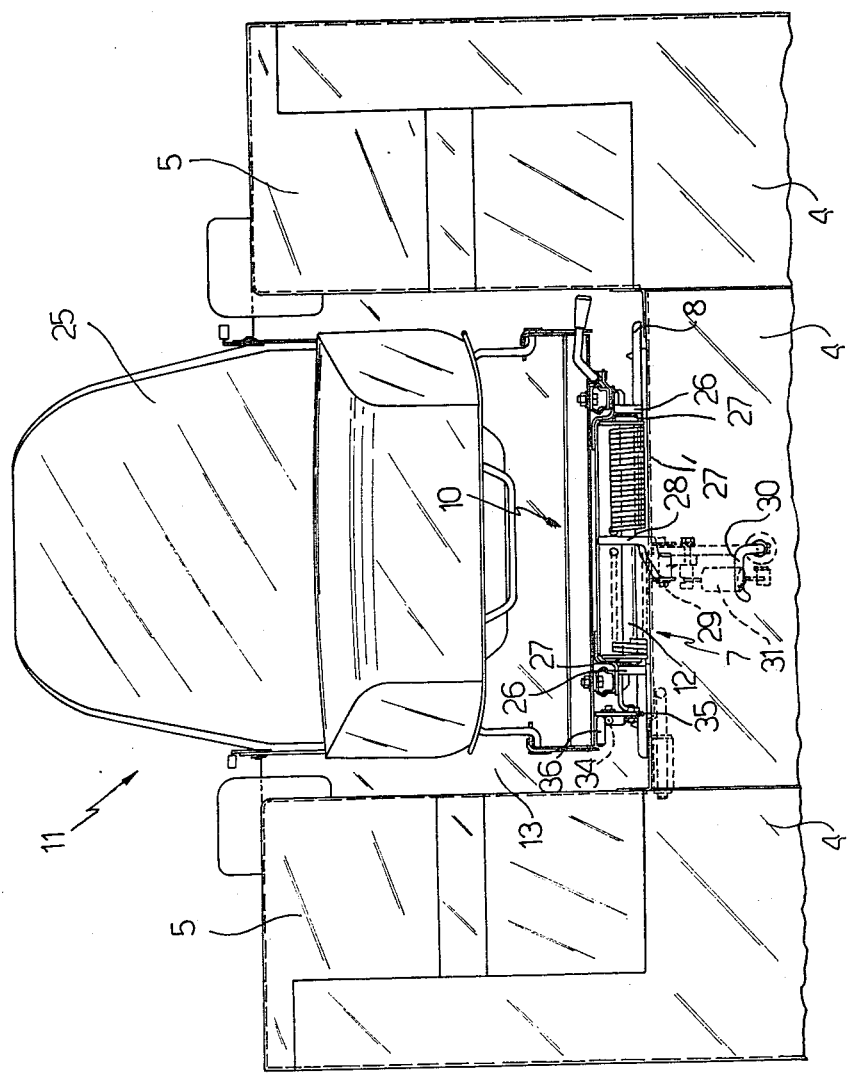

SEAT SUPPORT STRUCTURE FOR THE DRIVING OF AN EARTH MOVING MACHINE

BACKGROUND OF THE INVENTION

This invention relates in general to vehicles and, in particular, to the operator's seat assembly of vehicles, such as construction and industrial machinery.

More specifically, but without restriction to the particular use which is shown and described, this invention relates to a support structure for the operator's seat of a vehicle, such as in an earth moving machine and the like. The improved seat support structure of the invention permits the seat assembly to be locked in stable and proper position for use by an operator in operation of the vehicle. The seat assembly is further releasable for pivotal movement about a pair of parallel axes for allowing unimpeded accessibility to the components of the vehicle, which are normally situated beneath the floor or frame under the operator's driving position.

In vehicles, such as construction machinery in the form of earth moving equipment and the like, the operator's seat is typically located at a position above many of the operative and control components of the vehicle, such as the hydraulic control devices for controlling various mechanical functions, the vehicle transmission, and the like. In the prior art, conventional seat assemblies have been attached to the vehicle in a manner to impede inspection or service of the vehicle components situated beneath the operator. Many past seat structures require the cumbersome and inconvenient disassembly of the seat components from the vehicle frame to permit such access to areas under the seat. Upon removal of such known seat assemblies, it is then possible to remove the panels and various structural parts of the vehicle to expose the vehicle mechanisms beneath the floor.

The requirement for removal of the seat structure through complete or partial disassembly has proven to be highly unsatisfactory and an inefficient operation. Attempts in the prior art to eliminate the necessity of disassembly or detachment of the seat and support from the vehicle, have also been ineffective. One such technique has employed a seat frame which is pivotally mounted about a single horizontal axis, such that the area of the vehicle beneath the assembly may be exposed. The pivotal support of the seat assembly about a single axis has at best only allowed limited accessibility to the components beneath the operator's position, because even in a rotated position, the seat structure generally includes protruding structural portions, which inhibit accessibility. Thus, because of the physical size of the seat assembly and its associated structural components, it is virtually impossible to attain satisfactory accessibility beneath a seat by mounting the structure for rotation about a single limited axis. The prior art assemblies having such a limited pivotal capability have also not been provided with effective latching mechanisms facilitating securement and release of the seat as circumstances required during use of the vehicle. Typical seat assemblies mounted for a limited degree of selected pivotal movement are disclosed in U.S. Pat. No. 3,095,232 to Stevens, issued July 25, 1963 and U.S. Pat. No. 3,463,542 to Daniels, issued Aug. 26, 1969.

SUMMARY OF THE INVENTION

It is, therefore, an object of this invention to improve the seat support structure of a vehicle.

Another object of this invention is to mount the seat support structure of a vehicle for selective pivotal movement about a pair of spaced axis.

A further object of the invention is to permit the seat support structure of a vehicle to be oriented at a position allowing enhanced accessibility to the area beneath the normal operative position of the seat.

Still another object of the invention is to improve the securement of the seat structure of a vehicle at a fixed operative position and permit selective release for movement to a remote orientation away from the operator's position.

These and other objects are attained in accordance with the present invention wherein it is provided an improved seat support structure, which is supported on a vehicle for selective pivotal movement about a pair of spaced lateral axes, such that the seat structure may be moved to a position permitting convenient access to the vehicle components normally mounted beneath the operator's position. The seat assembly herein disclosed is mounted upon a pair of spaced shaft means and includes releasable latch means to selectively release the seat structure for independent pivotal movement about each of the axes established by the shaft means. The improved seat structure of the invention permits unimpeded access to the components of the vehicle, such as the transmission, hydraulic control devices, and the like, which are typically mounted beneath the operator's seat.

DESCRIPTION OF THE DRAWINGS

Further objects of the invention, together with the additional features contributing thereto and advantages accruing therefrom, will be apparent from the following description of a preferred embodiment of the invention, which is shown in the accompanying drawings with like reference numerals indicating corresponding parts throughout; wherein:

FIG. 1 is a side schematic view of the seat support structure of the invention mounted at the driving position of a vehicle showing in phantom the plurality of pivotal movements which may be imparted to the seat structure;

FIG. 2 is a side schematic view of the structural details of the seat support structure of FIG. 1; and FIG. 3 is an end schematic view of the seat support structure of FIG. 2.

DESCRIPTION OF A PREFERRED EMBODIMENT

Referring now to FIG. 1, there is illustrated the seat support structure of the invention positioned at the operator's driving position of a vehicle, such as, in an earth moving machine and the like. One or more hydraulic devices 1 controlling various mechanical mechanisms of the vehicle, a portion of the vehicle gear box 2, and a vehicle transmission 3 are typically positioned beneath the operator's seat and are covered by a plurality of panels 4 forming a portion of the vehicle body structure. As best shown in FIG. 3, a ledge 5 is disposed on each side of the operator's seat, and a vehicle fuel tank 6 is situated behind the operator as shown in FIG. 1. The seat support structure of the invention is mounted on the vehicle by means of a seat support assembly 7 at a secured position above the hydraulic devices 1, the vehicle gear box 2, and the vehicle transmission 3.

The seat support assembly 7 includes a base plate 8 which is mounted for selective pivotal movement relative to the panel 4 on a horizontal shaft 9 disposed at a position adjacent the rear edge portion of the base plate and extending laterally of the vehicle. The base plate 8 may be constructed in a rectangular configuration, such that the horizontal shaft 9 is situated adjacent its rear lateral edge. A seat frame 10 is suitably attached to the plate 8 in a manner to be described and supports an operator's seat 11. The frame 10 and seat 11 are pivotally mounted to the base plate 8 by a horizontal shaft 12 which extends laterally relative to the vehicle along an axis substantially parallel to the axis established by rear shaft 9. The forward shaft 12 is disposed adjacent the front lateral edge of the base plate 8 to pivotally mount the frame 10 and the seat 11 at a position forward of the rear shaft 9.

In the horizontal orientation shown in FIG. 1, the base plate 8 is arranged to cover an access opening 8a provided in one of the vehicle panels 4, which is horizontally positioned over the hydraulic control devices 1, gear box 2 and transmission 3. The access opening 8a permits access to such components positioned beneath the panels 4.

The rear shaft 9, to which the base plate 8 is pivotally mounted, is secured to a rear vertical wall 13 as shown in FIG. 2. A pair of brackets 14 (one of which is shown in FIG. 2) is secured by a suitable means to the vertical wall 13 and include an aligned pair of openings for receiving and mounting the rear shaft 9. A second pair of brackets 15 is affixed in a conventional manner to the base plate 8, and the brackets 15 likewise include aligned openings for receiving and mounting the rear shaft 9, such that a hinged-like support of the base plate 8 for pivotal motion about the rear shaft 9 is provided. A spring 16 is helically disposed about a portion of the horizontal shaft 9 to counterbalance the weight of the base plate 8 with the seat frame 10 and seat 11 mounted thereon, and facilitates pivotal movement of the base plate 8 relative to the wall 13. The spring 16 includes a central portion 17, which loops through a lug 18 attached to the base plate 8, and possesses a pair of ends 19, (one of which is shown in FIG. 2). The ends of the spring are both resiliently urged against the vertical wall 13 to provide a resilient biasing force between the base plate 8 and the wall 13.

The seat frame 10 may be constructed in any suitable structural configuration, including a plurality of interconnected longitudinal and cross members. A seat adjustment means (a portion of which is shown in FIG. 3) may be disposed in operative position between the seat frame 10 and the seat 11 to permit axial and vertical adjustment of the position of the seat 11 relative to the seat frame 10, as well as to vary the inclination of the seat back 25.

The seat frame 10 is pivotally mounted on the forward shaft 12 relative to the base plate 8 by means of two pairs of brackets 26 and 27, respectively affixed to the base plate 8 and the seat frame 10. The two pairs of brackets 26 and 27 each include shaft receiving openings through which the forward shaft 12 extends attaining a pivotal coupling of the seat frame 10 to the base plate 8 as shown in FIGS. 1, 2 and 3. A helical spring 27' is mounted in surrounding relationship to the horizontal shaft 12 to provide a counterbalancing force to the weight of the seat frame 10 during rotation relative to the base plate 8. The spring 27' includes a pair of opposite ends (not shown), which resiliently bear respectively against a portion of the seat frame 10 and a portion of base plate 8 to attain a resilient biasing force therebetween.

The seat support structure of the invention may be retained in a locked position relative to the horizontal shafts 9 and 12 by means of a respective forward and rear latching assembly as illustrated in FIGS. 2 and 3. The forward latching assembly includes a retaining latch 28 for controlling pivotal movement of the base plate 8 about the rear shaft 9. The retaining latch 28 is pivotally mounted on a horizontal rod 29 suitably secured to one of the panels 4, which is disposed beneath the seat frame 10, as best shown in FIG. 2. The retaining latch 28 may be pivotally moved as required by means of a foot lever 30. The lever 30 includes a portion projecting outward through one of the panels 4 at a position beneath the seat structure to permit manipulation thereof by the operator. In its locking mode to secure the base plate 8 in position, the retaining latch 28 contacts a portion of the forward shaft 12 and is maintained in a locked configuration by means of a biasing spring member 31. The spring member 31 is disposed in attached relationship to a notch in one of the panels 4 and to an arm rigidly coupled to the retaining latch 28, as best shown in FIGS. 2 and 3. To release the base plate 8 for pivotal movement, the foot lever 30 is manipulated, and the base plate 8 may be pivoted in a manner to be described.

The rear latching assembly for controlling pivotal movement of the seat frame 10 and the seat 11 about the forward shaft 12 includes a first retaining latch 32 that is pivotally mounted to a horizontally disposed shaft 33 mounted on the seat frame 10. Pivotal movement of the first retaining latch 32 may be effected through movement of an elongated rod 34 which is coupled at a rear end to the first retaining latch 32 by suitable means. The forward end of the rod 34 is pivotally coupled to a bracket member 35 that is pivotally mounted on the forward shaft 12. An operating lever 36 extends outward from the front of the seat frame 10 and is coupled to the bracket member 35 to permit manual manipulation of the elongated rod 34 through the coupling provided by the bracket member 35. A second latching member 37 is rigidly attached to the base plate 8 and includes an upward hook-like portion which interconnects with the first retaining latch 32 in the locked orientation of the seat structure. Manipulation of the operating lever 36 to the position shown in phantom in FIG. 2 causes the first retaining latch 32 to be moved to the position also shown in phantom in FIG. 2, as a result of clockwise movement of the bracket 35 about the forward shaft 12 causing the rod 34 to be displaced in an aft direction.

In operation, when the latching mechanisms are latched to retain the seat frame 11 in the position shown in FIGS. 2 and 3, the seat 11 and base plate 8 are locked for normal operation of the vehicle. In the locked mode of the seat 11, access opening 8a, disposed beneath the seat structure, is covered by the base plate 8. The base plate 8 is locked relative to the rear shaft 9 by the retaining latch 28 being secured against the forward shaft 12 by the spring 31. The seat frame 10 is similarly restrained against pivotal movement about the front shaft 12 because of the latching relationship between the first retaining latch 32 and the second retaining latch 37.

When it is desired to provide temporary access to the vehicle components disposed beneath access opening 8a, or for any other situation dictating alteration of seat position, the operator may stand on one of the horizontal panels 4 in front of the seat structure and manually raise the lever 36 to the position shown in phantom in FIG. 2. Such upward movement of the handle 36 effects disengagement of the first retaining latch 32 from the second retaining latch 37 as previously discussed. Upon release, the seat frame 10 may be readily pivoted about the forward shaft 12 in a counterclockwise direction as shown in phantom as position A in FIG. 1. The foot lever 30 can then be manipulated for displacement to the position shown in phantom in FIG. 2 and disengages or releases the retaining latch 28 from the forward shaft 12. In the latter released relationship, the base plate 8 may be swung in a clockwise direction relative to the back wall 31, while the seat 11 is being pivoted relative to the base plate 8, as shown in phantom as position B in FIG. 1.

Upon the seat 11 attaining the upper position, designated as position B in FIG. 1, the seat 11 may be further adjusted by rotating the seat frame 10 clockwise viewing FIG. 1 to cause the seat structure to rest upon the fuel tank 6 of the vehicle, with the base plate 8 aligned in a substantially vertical position against the tank as shown as position C in FIG. 1. Thus, the seat 11, through the release of the latching mechanisms, can be rotated counterclockwise, viewing FIG. 1 about the horizontal shaft 12 to the position A, then rotated upward, in conjunction with the base plate 8, to the position B, and then again downward in a clockwise direction relative to plate 8 to cause the seat frame 10 to rest on the upper surface of the vehicle fuel tank 6. In position C of the seat structure as shown in FIG. 1, it should be apparent that the access aperture 8a is exposed without physical interference from the seat structure. Moreover, the removal of the seat structure from the operator's position as shown, permits the panels 4 to be also disassembled. If necessary, to provide further access to the various components of the vehicle, such as the hydraulic devices 1, the gear box 2, and the transmission 3.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a vehicle having a body structure above a portion of a mechanism of the vehicle with an access opening in the body structure to provide access to the mechanism and a seat support assembly above the access opening, said seat support assembly comprising: first pivot means attached to the vehicle body structure adjacent to the access opening adjacent to the rear of the vehicle, flat base means having one edge attached to the first pivot means for selective pivotal movement about a first axis, first latching means operable to secure said base means in a fixed position relative to the vehicle above the access opening and being releasable to permit selective pivotal movement about said first axis, seat support means coupled to an opposite edge of said base means and supporting a seat of the vehicle, second pivot means to attach said seat support means to said base means for selective pivotal movement about a second axis, said second pivot means being spaced from the first pivot means a distance greater than the height of the vehicle body structure adjacent to the access opening above the first pivot means, second latching means operable to secure said seat support means in a fixed position relative to said base means and being releasable to permit said selective pivotal movement of said base means about said second axis independent of said selective pivotal movement about said first axis, and said selective pivotal movement about said first and second axis allowing said base means and said seat support means to be moved to a position wherein the base means is pivoted away from the access opening to an attitude substantially parallel to the vehicle body structure adjacent to the access opening, and the seat support is positioned away from the access opening and above said vehicle body structure to provide access to portions of the vehicle disposed beneath said base means and said seat support in said fixed position.

2. The assembly according to claim 1 wherein said first and second axes are horizontally disposed in parallel relationship to each other.

3. The assembly according to claim 2 wherein said first and second axes extend laterally of the vehicle.

4. The assembly according to claim 1 wherein said first pivot means includes counterbalancing means to apply a counterbalancing force to said base means to facilitate said selective pivotal movement about said first axis.

5. The assembly according to claim 4 wherein said counterbalancing means includes resilient means to apply said counterbalancing force.

6. The assembly according to claim 1 wherein said second pivot means includes counterbalancing means to apply a counterbalancing force to said seat support means to facilitate said selective pivotal movement about said second axis.

7. The assembly according to claim 6 wherein said counterbalancing means includes resilient means to apply said counterbalancing force.

8. The assembly according to claim 3 wherein said first pivot means is coupled to a rear portion of said base means and establishing said first axis.

9. The assembly according to claim 8 wherein said second pivot means is coupled to a forward portion of said seat support means establishing said second axis at a position forward of said first axis relative to the longitudinal axes of the vehicle.

10. The assembly according to claim 1 wherein said first latching means includes a retaining latch member selectively moveable to a position to engage a portion of said second pivot means for securing said base means in said locked position.

11. The assembly according to claim 10 wherein said retaining latch member of said first latching means is further selectively moveable to a position out of engagement with said portion of said second pivot means to permit said pivotal movement of said base means about said first axis.

12. The assembly according to claim 1 wherein said second latching means includes a retaining latch member selectively moveable to a position to engage a portion of said first pivot means for securing said seat support means in said locked position.

* * * * *